(12) United States Patent
Kim

(10) Patent No.: US 11,916,792 B2
(45) Date of Patent: Feb. 27, 2024

(54) VEHICLE COMMUNICATION CONTROL DEVICE AND METHOD

(71) Applicant: HL Klemove Corp., Pyeongtaek-si (KR)

(72) Inventor: Jeong Eun Kim, Seongnam-si (KR)

(73) Assignee: HL KLEMOVE CORP., Incheon (KR)

(*) Notice: Subject to any disclaimer, the term of this patent is extended or adjusted under 35 U.S.C. 154(b) by 95 days.

(21) Appl. No.: 17/693,593

(22) Filed: Mar. 14, 2022

(65) Prior Publication Data
US 2022/0294735 A1     Sep. 15, 2022

(30) Foreign Application Priority Data
Mar. 12, 2021  (KR) .......................... 10-2021-0032724

(51) Int. Cl.
H04L 47/12          (2022.01)

(52) U.S. Cl.
CPC .................................. *H04L 47/12* (2013.01)

(58) Field of Classification Search
None
See application file for complete search history.

(56) References Cited

FOREIGN PATENT DOCUMENTS

| CN | 101111826 | * | 1/2006 |
| DE | 112017004406 | * | 5/2019 |
| KR | 20190081407 | * | 7/2019 |
| WO | WO2018230988 | * | 12/2018 |

* cited by examiner

Primary Examiner — Andre Tacdiran
(74) Attorney, Agent, or Firm — Harvest IP Law, LLP

(57) ABSTRACT

The embodiments of the present disclosure relate to a vehicle communicatin control device and method capale of distributing and allocating messages so as for the messages to be not concentrated on specific hardware resources in vehicle communication, and capable of preventing the omission of processing of messages allocated to hardware resources.

14 Claims, 8 Drawing Sheets

VEHICLE COMMUNICATION CONTROL DEVICE AND METHOD

CROSS REFERENCE TO RELATED APPLICATION

This application claims priority from Korean Patent Application No. 10-2021-0032724, filed on Mar. 12, 2021, which is hereby incorporated by reference for all purposes as if fully set forth herein.

TECHNICAL FIELD

Embodiments of the present disclosure relate to a vehicle communication control device and method, more particularly, relates to a device and method for controlling vehicle communication to allocate messages to hardware resources using information in messages.

BACKGROUND

For a vehicle communication, there are widely used multiple communication technologies for transmitting and receiving messages using multiple hardware resources. In this case, since the processing capacity and processing speed of each hardware resource are generally limited, if messages are concentrated and allocated to a specific hardware resource, a load may occur on the vehicle communication network.

In addition, if the processing of a new message is requested for a hardware resource which has already reached the processing limit state, there is a problem that processing of the new message may be omitted as well as the processing of the message is delayed.

Accordingly, there is a demand for a method for distributing message allocations related to hardware resources so as to not be concentrated, and a mathod for preventing the processing of allocated messages from being omitted.

SUMMARY

Embodiments of the present disclosure provide a vehicle communication control device and control method capable of distributing and allocating messages so as for the messages to be not concentrated on specific hardware resources in vehicle communication.

Embodiments of the present disclosure provide a vehicle communication control device and control method capable of preventing the omission of processing of messages allocated to hardware resources in vehicle communication.

In an aspect of the present disclosure, the present embodiments may provide a vehicle communication device including a storage device including at least one message object in which a message is stored, and a controller configured to, allocate the message to a message object determined based on a preset message allocation criterion, determine whether the message can be stored on the basis of a state of an allocated message object, and control the message to be processed if the message is stored in the allocated message object, wherein the message includes at least one of communication period information on a communication period of the message and identification number information on an identification number of the message, wherein the message allocation criterion is set based on at least one of the communication period information and the identification number information.

In another aspect of the present disclosure, the present embodiments may provide a vehicle communication method including setting a message allocation criterion for allocating a message to one of at least one message object based on at least one of communication period information on a communication period of the message and identification number information on an identification number of the message, allocating the message to a message object determined based on the message allocation criterion, and determining whether the message can be stored based on a state of the allocated message object, and controlling, if the message is stored in the allocated message object, the message to be processed.

According to embodiments of the present disclosure, it is possible to provide a vehicle communication control device and control method capable of distributing and allocating messages so as for the messages to be not concentrated on specific hardware resources in vehicle communication.

In addition, according to embodiments of the present disclosure, it is possible to provide a vehicle communication control device and control method capable of preventing the omission of processing of messages allocated to hardware resources in vehicle communication.

DETAILED DESCRIPTION

Figure 1:
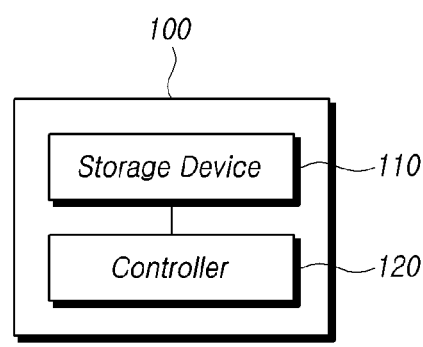
FIG. 1 is a block diagram of a vehicle communication control device according to the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a block diagram of a vehicle communication control device according to the present disclosure.

A vehicle communication may include device-to-device multi-communication in which a message is transmitted/received using multiple hardware resources. Such vehicle communication may include all types of communication such as communication between in-vehicle devices as well as communication between in-vehicle devices and external devices. In addition, vehicle communication may include both a wired communication method and a wireless communication method.

In addition, vehicle communication may include performing according to a controller area network (CAN) communication standard. In this case, a message may be configured in a form including a message frame according to the CAN communication standard. However, it is not limited to performing according to the CAN communication standard, and any known technology related to device-to-device communication may be used without limitation.

Referring to FIG. 1, the vehicle communication control device 100 according to the present disclosure may include a storage device 110 and a controller 120. In addition, the storage device 110 and the controller 120 may be connected to each other.

As an example, the vehicle communication control device 100 may include a storage device 110 including at least one message object in which a message is stored, and a controller for allocating each message to a message object determined based on a preset message allocation criterion and controlling the message to be stored in the message object based on the allocation result.

The storage device 110 may store at least one message which can be used for vehicle communication. Here, the message may include both a message generated within the vehicle communication control device 100 and a message received from the outside.

In addition, the message may be transmitted/received between each device of the vehicle or between components inside each device, and information included in the message may be transmitted through transmission/reception of the message.

The message may include at least one or more pieces of information. For example, the message may include at least one of identification number information on an identification number of the message, communication period information on a communication period of the message, and priority information on a priority of the message.

However, the present disclosure is not limited thereto, and the information included in the message may further include other information which can be used for vehicle communication.

The identification number information of the message may be assigned based on a preset rule. The identification number information is a number for distinguishing and identifying each message based on information included in each message, and a preset rule may be set based on a field indicating a transmission location and type of each message, respectively.

In addition, the identification number information may be set to have one unique identification number for each message. Therefore, even for messages of the same type transmitted from the same location, different identification numbers may be assigned to each message and the messages can be distinguished through the identification number.

The communication period information may include information about at least one of a transmission period and a reception period of a message. Such communication period information may be set to a preset value when a message is generated. However, the present disclosure is not limited thereto, and after the message is generated, the communication period information may be set to a value calculated using the transmission/reception time of the message.

Meanwhile, the communication period information may be set to NULL or 0 if the message is not periodically transmitted and received. In this case, the message in which the communication period information is set to NULL or 0 may be set to be excluded from a selection message selected to calculate a least common multiple period in setting the criterion change condition to be described later.

The priority information may include information about a priority of processing each message. Here, the priority may be set according to a type and content of each message, or may be set based on the order in which the messages are received.

In some cases, the identification number information may be configured in a form including priority information. Specifically, each message may be classified by classification according to the type and content of the message, and an identification number may be assigned in consideration of the priority of processing. That is, the priority may be expressed in the identification number information.

For example, a message having identification number information of 12 may be determined to have higher priority information than a message having identification number information of 20.

In addition, the priority information may be set to be indicated using the entire identification number information.

Alternatively, the priority information may be set to be indicated using only a specific field part of the identification number information.

For example, in the 5-digit identification number information, the last two digits may be set as a priority information field. In this case, since the message with the identification number information of 0×012 has priority information of 12, and the message with the identification number information of 0×020 has priority information of 20, the message with the identification number information of 0×012 may be determined to have a higher priority than the message with the identification number information of 0×020.

A message used for vehicle communication may be stored in a message object, and the stored message may be processed by the message object. That is, since the stored message includes signal information necessary for vehicle communication, there may be performed a response thereto through the message object. In this case, the controller 120 may determine whether the message can be stored based on the message allocation result.

Specifically, if a message is allocated to a specific message object, each message can access the allocated message object. In the case that a message accesses the message object, the controller 120 may determine whether the message can be stored based on a state of the message object. In this case, the storage location of the message may be additionally determined based on the state of the message object. In addition, in determining whether messages can be stored according to the state of the message object, the controller 120 may determine whether the message can be stored based on priority information of each message.

The message object may include a configuration in which messages can be stored up to a preset storage capacity. In this case, the storage capacity of the message object may be set based on the number of messages or based on the size of the message.

In some cases, the storage device 110 may include page information prepared by constructing a separate page for the state of each message object and information about the stored message. In this case, the page information may be provided to the controller 120, and the controller 120 may allocate a message using the page information.

The controller 120 may set or change a message allocation criterion, and may allocate each message to one of the message objects based on the message allocation criterion. In addition, the controller may determine whether a message can be stored in the allocated message object, and if the message is stored, the controller may control the message to be processed by the allocated message object.

In addition, the controller 120 may be provided with information about time measured in the vehicle communication control device 100 in relation to message allocation criterion setting, message allocation, and message storage control.

For example, the controller 120 may be provided with information about the transmission time and reception time of the message, the time stored in the message object, and the like. Such information may be in the form of an absolute time, or may be in a format indicating the elapsed time after a preset reference time.

The controller 120 may set a message allocation criterion based on at least one of communication period information and identification number information of the message.

As an example, the controller 120 may set the message allocation criterion so that messages having the same communication period information are allocated to the same message object.

As another example, if there are at least two or more messages having different communication period information based on the communication period information, the controller 120 may create a message group by grouping the messages according to a preset communication period range based on different communication period information.

For example, the communication period from 1 to 10 may be set as a first communication period range, and the communication period from 11 to 20 may be set as a second communication period range. As described above, the communication period range may be set in units of 10, but this is an example, and the communication period range may be set in different numerical units, or the first communication period range and the second communication period range may be set to different ranges.

In this case, the controller 120 may set the message allocation criterion so as to be allocated to different message objects for each grouped message group. Alternatively, the controller 120 may set the message allocation criterion so that messages of the same group are allocated to the same message object. Accordingly, the controller 120 may group messages according to a preset communication period range and allocate the message to message objects based on the grouped message groups, thereby preventing message allocation from being concentrated on a specific message object.

As another example, the controller 120 may allocate a message using a message allocation criterion set based on identification number information, but if a preset criterion change condition is satisfied, the controller may allocate the message based on the communication period information.

For example, the controller 120 groups each message according to a preset identification number range, and may set the message allocation criterion so that messages included in the same message group are allocated to the same message object.

In this case, the criterion change condition may be set based on whether a time point set based on a least common multiple period calculated based on the communication period information has arrived.

Accordingly, the controller 120 may set a message allocation criterion according to the above-described embodiments, and may allocate a message to a message object determined based on the message allocation criterion.

Hereinafter, it will be described message storage control in which the controller 120 controls whether to store a message allocated to a message object and to process the stored message.

The controller 120 may control whether of storing each message in an allocated message object based on the message allocation criterion and whether of processing the message through the message object. Such control may be performed based on the priority information of the message.

Specifically, if a new message is allocated to a message object, the controller 120 may control the new message to access the allocated message object. In this case, the controller 120 may determine whether the storage of the new message is possible in the message object. In addition, if it is determined that the storage is possible, the controller may control to store and process the new message.

In this case, the controller 120 may perform the determination of whether to store the new message, storage and processing control by using the above-described page information including the state of each message object and information about the storage message.

Determination of whether to store the message may be performed based on the number of the stored messages stored in the message object and storage capacity. Here, the storage capacity may be set based on at least one of the number and size of stored messages stored in the message object.

For example, if the storage capacity of a message object is set to store up to three messages, and if there are two stored messages stored in the message object, there may be determined that the storage of a new message is possible. On the other hand, if the number of messages stored in the message object is three, there may be determined that a new message cannot be stored.

As another example, if the storage capacity of the message object is set to be stored up to 24 bytes and the size of the new message is 8 bytes, the result of determining whether to store the new message may vary depending on the size of the message stored in the message object.

For example, if the number of stored messages is 2, and the sizes of stored messages are 8 bytes and 12 bytes, only 24−(8+12)=4 bytes of storage space remains.

Accordingly, there may be determined that a new message having a size of 8 bytes cannot be stored.

As another example, if the number of stored messages is 3 and each size is 4 bytes, since storage space of 24−(4*3)=12 byte remains, there may be determined that the new message of 8 bytes can be stored.

As described above, if it is determined that the storage of the new message is impossible, the controller 120 may control not to store the corresponding new message. Alternatively, a separate buffer may be provided in the storage device 110 to store messages allocated to the message object, but not stored due to the capacity of the message object. In this case, if the message object is converted to a state in which a new message can be stored, the controller 120 may control the messages stored in the buffer to be stored and processed in the corresponding allocated message object.

In addition, whether to use such a buffer may be set to be determined differently according to the content of each message not stored in the message object. For example, in the case of a message in which the same content is periodically received, the buffer may be set not to be used, and the buffer may be set to be used only for aperiodic messages.

On the other hand, if it is determined that the new message can be stored, the new message may be stored in the allocated message object, and in this case, the controller 120 may control the message stored through the message object to be processed in consideration of the priority information of the message.

For example, if the priority information of a first stored message stored in the message object is 12, the priority information of a second stored message is 20, and the priority information of the newly stored message is 16, the controller may control the first stored message, the new message, and the second stored message to be sequentially processed in order of priority. For another example, the controller 120 may control the storage order to be changed based on priority information of messages currently stored but not processed, and may control messages to be processed according to the stored order.

Meanwhile, the controller 120 may control the message allocation criterion to be changed. The message allocation criterion change may be performed so that another message allocation criterion is temporarily applied if a preset criterion change condition is satisfied. Alternatively, the message allocation criterion change may be performed so that the changed message allocation criterion is applied to all message allocation after the change.

For example, while allocating a message according to a first message allocation criterion, if the criterion change condition is satisfied, the controller 120 may control to allocate messages by temporarily changing the second message allocation criterion, or may allocate messages after the change condition is satisfied according to the second message allocation criterion. In the case that the second message allocation criterion is temporarily changed, if the criterion change condition is released, the second message allocation criterion may be changed back to the first message allocation criterion.

The criterion change condition may be set based on whether of an arrival of a time point set based on the least common multiple period calculated based on the communication period information.

As another example, the controller 120 may change the message allocation criterion based on the result of a test message allocation simulation.

For example, the controller 120 may generate at least two or more test messages and perform a test message allocation simulation for allocating each test message to a message object based on a message allocation criterion.

Thereafter, the controller 120 may determine a test message quota for the number of test messages allocated to each message object based on the result of the test message allocation simulation. In addition, if at least one of these test message quotas exceeds the preset allowable quota, the controller may change the message allocation criterion so that the test message quota does not exceed the allowable quota.

Hereinafter, in FIGS. 2 and 3, it will be exemplarily described problems that may occur in connection with a configuration for allocating messages in vehicle communication and a configuration for solving these problems using the vehicle communication control device 100 according to the present disclosure.

Figure 2:
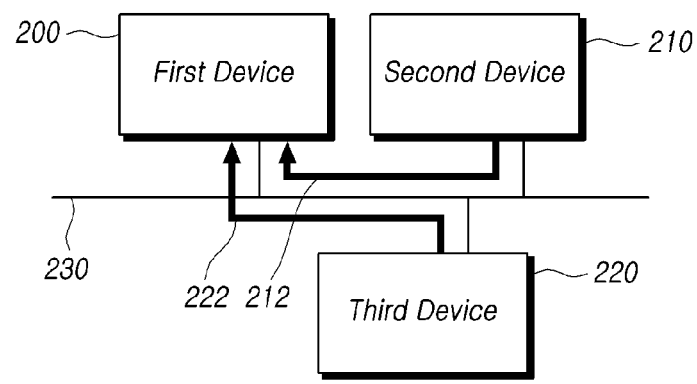
FIG. 2 is a diagram for explaining a configuration for performing vehicle communication according to an embodiment.

FIG. 2 is a diagram for explaining a configuration for performing vehicle communication according to an embodiment.

Referring to FIG. 2, a vehicle communication according to an embodiment may be performed between a first device 200, a second device 210 and a third device 220. In this case, the first device 200, the second device 210 and the third device 220 may be connected to each other and may transmit and receive messages by sharing a communication path 230.

The first device 200, the second device 210 and the third device 220 may each include the same configuration as the vehicle communication control device 100 according to the present disclosure. That is, the first device 200, each of the second device 210 and the third device 220 may include configuration for controlling to allocate a message to a message object, store and process the allocated message in the message object.

In this case, since the number of message objects included in each device is limited, there may occur a case in which the number of messages to be processed is greater than the number of message objects included in one device.

As a result, in such device-to-device communication, messages transmitted from each device can be centrally received by one device, and if the messages are allocated to the same message object within the corresponding device, the message allocation may be concentrated on specific message objects.

For example, a case may occur in which both transmission message flow 212 of the second device and the transmission message flow 222 of third device are centralized to the first device 200.

In this case, in the first device 200, in controlling to allocate, store and process the messages transmitted by the second device 210 and the third device 220 to the message object, the message allocation may be concentrated on a particular message object, while relatively few messages may be allocated to other message objects.

Figure 3:
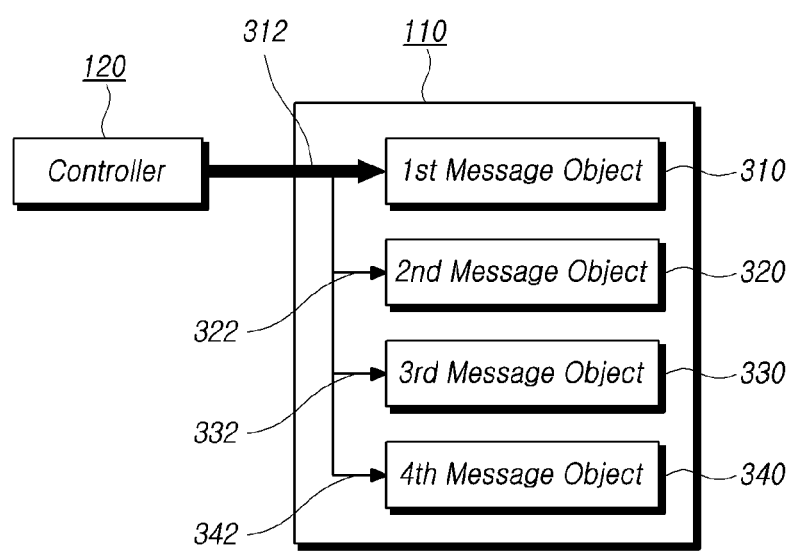
FIG. 3 illustrates an example of a configuration in which a message is allocated in the vehicle communication control device according to an embodiment.

FIG. 3 illustrates an example of a configuration in which a message is allocated in the vehicle communication control device according to an embodiment.

Referring to FIG. 3, the storage device 110 may include a first message object 310, a second message object 320, a third message object 330, and a fourth message object 340. However, the configuration including four message objects is exemplary, and there may be used any configuration including at least one message object without limitation.

The controller 120 may allocate each message to a message object determined based on the message allocation criterion, and control each message to be stored and processed in the allocated message object.

In this case, since the number of message objects is limited, as a result of allocating messages based on the message allocation criterion, the messages may be not evenly distributed to each message object, and message allocation may be concentrated on a specific message object.

For example, a message quota 312 of the first message object 310, a message quota 322 of the second message object 320, a message quota 332 of the third message object 330 and a message quota 342 of the fourth message object 340 may not be evenly distributed with each other.

As shown in FIG. 3, since the message quota 312 of the first message object 310 is greater than the message quota 322 of the second message object 320, the message quota 332 of the third message object 330 and the message quota 342 of the fourth message object 340, the message allocation may be concentrated on the first message object 310.

In particular, if each message is a periodic message transmitted and received at a predetermined period, message allocation may be intensively performed according to the period of each message, and accordingly, such message allocation concentration may occur periodically.

This message allocation concentration may cause problems in which message processing is delayed or messages are lost. In order to solve these problems, it is required to distribute and allocate messages to each message object.

Hereinafter, in relation to such message allocation concentration, it will be described embodiments of allocating messages for each method of setting message allocation criterion.

As an example, the controller 120 may set a message allocation criterion so that messages having the same communication period information are allocated to the same message object.

In this case, even if a plurality of messages requiring message allocation occur at the same time, messages having different communication period information may be allocated to different message objects, so that the messages can be distributed and allocated to the message objects.

In particular, in the case that a time point set based on the least common multiple period of the communication period information of each message is reached, and the number of messages requiring allocation is increased, the message having the same communication period information as above may be allocated to the same message object, thereby increasing the effect of distributing the message to each message object.

As another example, in the case that there are at least two messages having different communication period information, the controller 120 may create a message group by grouping the messages according to a preset communication period range based on the communication period information. In addition, the controller 120 may set the message allocation criterion so that messages are allocated to different message objects for each message group.

In this case, even if a plurality of messages requiring message allocation occur at the same time, messages having different communication period information may be grouped and distinguished according to a preset communication period range, and may be allocated to different message objects for each group. Accordingly, it is possible to prevent messages with different communication period ranges from being concentrated on a specific message object.

In particular, in the case that the number of messages requiring allocation increases by reaching a time point set based on the least common multiple period calculated based on the communication period information of each message, each message may be grouped based on a preset communication period range and allocated to different message objects, thereby increasing the effect of distributing messages to each message object.

As another example, the controller 120 may allocate a message using a message allocation criterion set based on identification number information, but if a preset criterion change condition is satisfied, may allocate a message based on communication period information.

For example, the controller 120 may create or generate a message group by grouping the messages to have a preset identification number range based on the identification information of each message, and may set the message allocation criterion so that messages included in the same message group are allocated to the same message object.

In this case, the criterion change condition may be set based on whether a time point set based on a least common multiple period calculated based on communication period information has arrived. In addition, if the criterion change condition is satisfied, the controller 120 may control messages to be allocated to a message object based on identification number information of the message, but messages having the same communication period information to be allocated to the same message object.

Here, the least common multiple period may be determined based on communication period information of a selection message selected by a preset selection number from among the messages. In addition, the selection number may be set not to exceed the number of message objects. The selection message may be selected so that communication period information of each selection message is different from each other.

However, the present disclosure is not limited thereto, and the least common multiple period may be selected based on a test message allocation simulation. For example, the controller 120 may generate test messages having different communication period information, perform a virtual allocation simulation on the message object of the test message, and determine the least common multiple period based on the simulation performance result.

Meanwhile, in the case that the selection message is used, a message having the same communication period information as the communication period information of each selection message among messages not selected as the selection message may be allocated to the same message object as each selection message. Accordingly, comparing to a simple allocation of a message using a message group divided according to the identification number range, the allocation criterion of the message object may be set by using the least common multiple period determined based on the communication period information as well as the identification number range, so that the allocation of messages to each message object can be further distributed.

Meanwhile, in the case that the message allocation criterion is set so that a message having the same communication period information is allocated to the same object, the communication period information to which this message allocation criterion is applied may be limited to the communication period information of the selection message selected by a preset selection number.

For example, there may be a case in which the communication period information of the messages to be allocated is 7 types of 10, 20, 30, 50, 70, 90, 100, and the message object includes four of a first message object 310, a second message object 320, a third message object 330, and a fourth message object 340 as shown in FIG. 3.

In this case, if a message allocation criterion is set so that a message having the same communication period information is allocated to the same message object using all seven types of communication period information, the messages having two or more types of communication period information may be allocated to one message object, and accordingly, the distribution efficiency of message allocation may deteriorate.

In addition, in the case that it is necessary to calculate the least common multiple period, if the least common multiple period is calculated based on seven types of communication period information, the value of the least common multiple may increase, and, accordingly, the distribution efficiency of message allocation may further decrease.

In order to prevent such a decrease in efficiency, by limiting the communication period information of the selection message selected to a preset selection number, the message allocation criterion may be set so that messages having the same communication period information are allocated to the same object.

For example, the messages having four types of communication period information of 10, 20, 50, and 100 may be selected from the seven types of 10, 20, 30, 50, 70, 90, and 100, so that a message having communication period information of 10 may be allocated to a first message object 310, a message having communication period information of 20 may be allocated to a second message object 320, a message having communication period information of 50 may be allocated to a third message object 330, and a message having communication period information of 100 may be allocated to a fourth message object 340.

In this case, messages having communication period information other than 10, 20, 50, and 100 may be set to be allocated using another method. For example, for the messages having communication period information of 30, 70, and 90, the message groups may be created by grouping messages to have a preset identification number range for each message group, and message allocation criterion may be set so that messages included in the same message group are allocated to the same message object.

As described above, the method of limiting the communication period information to which the message allocation criterion is applied to the communication period information of the selection message selected by the preset selection number may be applied to all other embodiments as long as the message allocation criterion include a contents in which the message with the same communication period information is allocated to the same message object.

As another embodiment, the message includes priority information regarding the priority of the message, and if a new message is allocated to the message object, the controller 120 may control so that the new message is stored in the message object. In addition, in the case that there are at least two messages stored in the message object, the controller may control the message having the higher priority information to be processed first.

For example, if a new message is allocated to a message object and stored in the allocated message object, the controller 120 may control the message having a higher priority among the messages stored in the message object to be processed first. Accordingly, even if multiple messages are stored in the message object, it is possible to increase the processing efficiency through the message object increased by processing the message with high priority first.

As another example, the controller 120 may generate at least two or more test messages, and perform a test message allocation simulation of allocating each test message to a message object based on a message allocation criterion. In addition, the controller 120 may calculate a test message quota for the number of test messages allocated to each message object based on the result of the test message allocation simulation, and, if at least one of the test message quota for each message object exceeds the preset allowable quota, the controller may change the message allocation criterion so that the test message quota does not exceed the allowable quota.

For example, the test message may mean a message generated to have the specific communication period information. There may be performed a virtual simulation of allocating the generated test message to a message object based on the message allocation criterion according to the above-described embodiments of the present disclosure. A test message quota for a test message allocated to the message object is calculated based on the simulation performance result, and the calculated test message quota is compared with a preset allowable quota for the message object. If the calculated test message quota exceeds the allowable quota, message loss or processing delay may occur when a message including the same information as the test message is allocated to the corresponding message object. Therefore, the controller 120 may change and set the message allocation criterion so that the test message quota does not exceed the allowable quota, and control messages to be allocated to the message object according to the changed message allocation criterion.

The message allocation criterion may be reset based on the message allocation simulation and the result thereof, it is possible to detect a specific case in which the message allocation is concentrated and exceeds the allowable quota, so that the message allocation distribution can be performed more precisely based on the detection result.

The vehicle communication control device 120 may be implemented as an electronic control unit (ECU) mounted on a vehicle. For example, the electronic control unit may include at least one or more elements of one or more processors, memories, storage unit, user interface input unit and user interface output unit, which may communicate with each other via a bus. Furthermore, the electronic control unit may also comprise a network interface for connecting to the network. The processor may be a CPU or a semiconductor device that executes processing instructions stored in memory and/or storage unit. Memory and storage unit may include various types of volatile/non-volatile storage media. For example, memory may include ROM and RAM.

More specifically, the vehicle communication control device 100 according to the present embodiment, and the storage device 110 and the controller 120 included therein may be implemented as a module of the electronic control unit.

The electronic control unit may include a processor, a storage device such as a memory, and a computer program capable of performing a specific function. In addition, the storage device 110 and the controller 120 may be implemented as software modules capable of performing respective corresponding functions.

That is, the storage device 110 and the controller 120 according to the present embodiment may be implemented as respective software modules and stored in a memory, and each software module may be executed at a specific time point in an arithmetic processing unit such as an ECU included in a vehicle communication system.

Hereinafter, it will be described a vehicle communication control method using the vehicle communication control device, and content overlapping with the above will be omitted if necessary.

Figure 4:
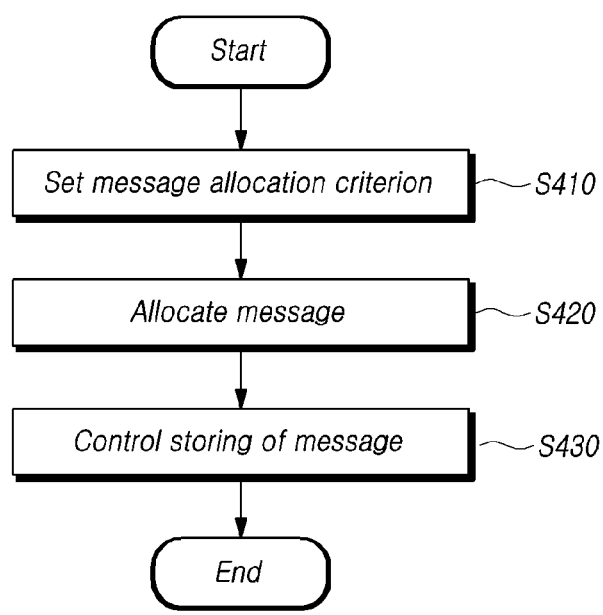
FIG. 4 is a flowchart related to a vehicle communication control method according to the present disclosure.

FIG. 4 is a flowchart related to a vehicle communication control method according to the present disclosure.

Referring to FIG. 4, the vehicle communication control method according to the present disclosure may include a message allocation criterion setting step S410, a message allocation step S420, and a message storage control step S430.

The message allocation criterion setting step S410 may include setting a message allocation criterion for allocating a message to one of at least one or more message objects based on at least one of communication period information and identification number information of the message.

For example, in the message allocation criterion setting step S410, the message allocation criterion may be set so that messages having the same communication period information are allocates to the same message object.

As another example, in the message allocation criterion setting step S410, if there are at least two messages with different communication period information, the message groups may be created by grouping the messages according to a preset communication period range based on the communication period information.

In addition, a message allocation criterion may be set to be allocated to a different message object for each message group.

As another example, in the message allocation criterion setting step S410, the message may be allocated using the message allocation criterion set based on the identification number information, but if the preset criterion change condition is satisfied, the message may be allocated based on the communication period information.

The message allocation step S420 may include allocating the message to a message object determined based on the message allocation criterion.

The message storage control step S430 ma include determining whether the message can be stored based on a state of the allocated message object, and if the message is stored in the allocated message object, controlling the message to be processed. In addition, the storage and processing of the message may be performed based on priority information.

Specifically, the message storage control step S430 may include, if a new message is allocated to a message object, controlling the new message to access the allocated message object, and determining whether the new message accessed to the message object can be stored, and controlling the new message to be stored and processed if the new message can be stored.

The determination of whether to store the message may be performed based on the message stored in the message object and the storage capacity. Here, the storage capacity may be set based on at least one of the number and size of stored messages stored in the message object.

If it is determined that it is impossible to store the new message, the controller may control not to store the new message. Alternatively, a separate buffer may be provided in the storage device to store messages allocated to the message object, but not stored due to the capacity of the message object. In this case, if the message object is converted to a state capable of storing a new message, the controller may control the message object stored in the buffer to be stored and processed in the allocated message object.

On the other hand, if it is determined that a new message can be stored, the new message may be stored in an allocated message object, and in this case, the controller 120 may control so that a message having higher priority information among messages stored in the message object is processed first.

Figure 5:
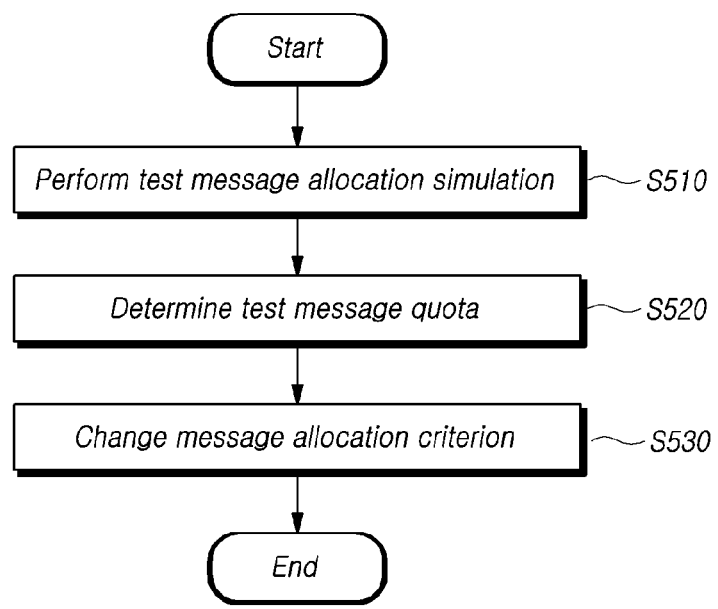
FIG. 5 is a flowchart of resetting a message allocation criterion according to an embodiment.

FIG. 5 is a flowchart of resetting a message allocation criterion according to an embodiment.

The message allocation criterion resetting step according to an embodiment may be performed after the message allocation criterion setting step S410.

Referring to FIG. 5, the message allocation criterion resetting step according to an embodiment may include at least one of a test message allocation simulation step S510, a test message allocation quota calculation step S520, and a message allocation criterion changing step S530.

The test message allocation simulation step S510 may include generating at least two or more test messages, and allocating each test message to a message object based on a message allocation criterion.

The test message quota calculation step S520 may include calculating a test message quota for the number of test messages allocated to each message object, based on the result of the message allocation simulation step.

The message allocation criterion changing step S530 may include, if at least one of the test message quota for each message object exceeds a preset allowable quota, changing the message allocation criterion so that the test message quota does not exceed the allowable quota.

The message allocation criterion may be reset based on the message allocation simulation and the result thereof, it is possible to detect a specific case in which the message allocation is concentrated and exceeds the allowable quota, so that the message allocation distribution can be performed more precisely based on the detection result.

Figure 6:
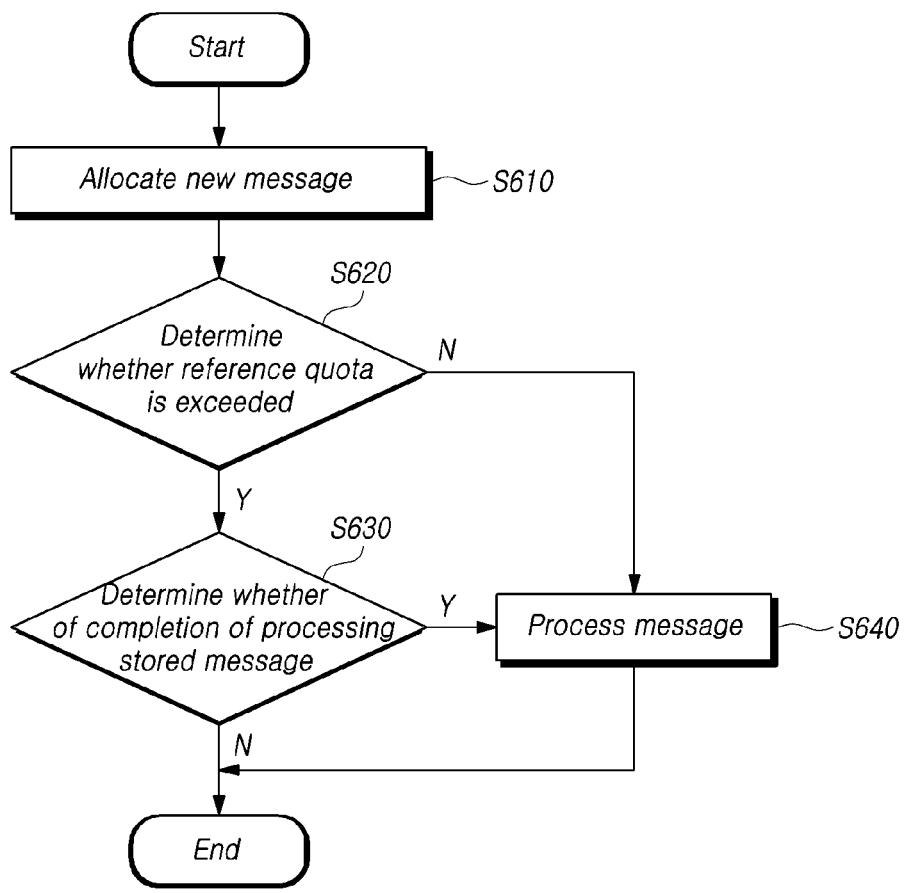
FIG. 6 is a flowchart for exemplarily explaining a message processing process in a vehicle communication control method according to an embodiment.

FIG. 6 is a flowchart for exemplarily explaining a message processing process in a vehicle communication control method according to an embodiment.

Referring to FIG. 6, the message processing process in the vehicle communication control method according to an embodimet may include at least one of allocating a new message S610, determining whether a reference quota is exceeded S620, determining whether the processing of the stored message is completed S630, and processing the message S640.

The new message allocating step S610 may include, if a transmission/reception request for a new message occurs, allocating a new message to a hardware resource of the vehicle communication control device. The hardware resources may include message objects.

In addition, in the new message allocation step S610, a message may be allocated to a message object based on a preset message allocation criterion. In this case, the message allocation criterion may be set to allocate messages within a certain identification number range to the same message object based on the identification number of the message.

In addition, the message allocation criterion may be readjusted if there is a message omission in the test step.

Also, the message object may include a message object register which the message can access. The message object register may include information necessary for determining whether an accessed message can be stored in a message object, whether a corresponding message can be processed in the message object, and the like.

The determining whether the reference quota is exceeded S620 may include determining whether there is a stored message previously allocated and stored in a message object to which a new message is allocated. For example, if a message quota of a corresponding message object is 2 or more based on a time point at which a new message is allocated, there may be determined that there is a stored message previously allocated and stored.

If it is determined that the stored message previously allocated and stored in the message object does not exist, the new message is stored in the allocated object, and a message processing step S640 for the new message may be performed.

If it is determined that there is a stored message previously allocated and stored in the message object, there may be performed the step S630 of determining whether the processing of the stored message is completed.

In the step S630 of determining whether the processing of the stored message is completed may include determining whether the message object has completed processing of the stored message previously allocated and stored.

If it is determined that processing of the stored message previously allocated and stored is completed, the new message is stored in the allocated message object, and a message processing step S640 for the new message may be performed.

If it is determined that the processing of the stored message previously allocated and stored is not completed, there may be terminated the message processing process in the vehicle communication control method according to an embodiment.

The message processing step S640 may include a message object accepting a transmission/reception request for a new message. Accordingly, a new message can be stored and processed in the corresponding message object.

Figure 7:
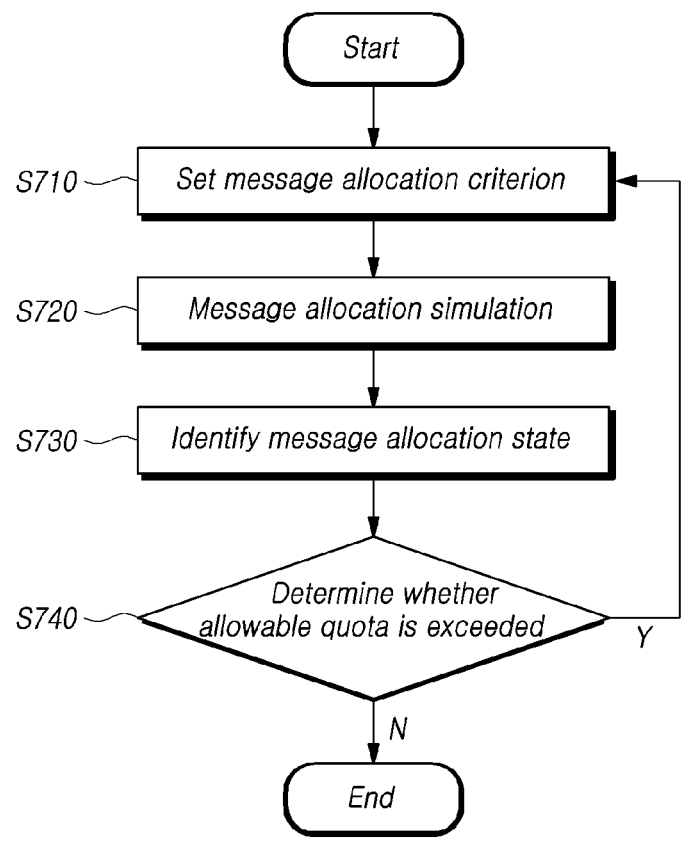
FIG. 7 is a flowchart for exemplarily explaining a message allocation simulation process in a vehicle communication control method according to an embodiment.

FIG. 7 is a flowchart for exemplarily explaining a message allocation simulation process in a vehicle communication control method according to an embodiment.

Referring to FIG. 7, the message allocation simulation process in the vehicle communication control method according to an embodiment may include at least one of a message allocation criterion setting step S710, a message allocation simulation step S720, a message allocation state identifying step S730, and a step S740 of determining whether allowable quota is exceeded.

The message allocation criterion setting step S710 may include setting a message allocation criterion with respect to criterion for allocating messages to message objects. In this case, a message allocation criterion may be set based on the communication period information of the message.

The message allocation simulation step S720 may include, in allocating a message to a message object based on the message allocation criterion set in the message allocation criterion setting step S710, performing a simulation for identifying whether a storage to the message object is possible.

The message allocation state identifying step S730 may include identifying a virtual message allocation state for each message object based on the result of the message allocation simulation step S720. In this case, the identifying of the message allocation state may include calculating a virtual message allocation quota for each message object.

The step S740 of determining whether allowable quota is exceeded may include determining whether the virtual message allocation state for each message object exceeds a preset allowable quota based on the identification result in the message allocation state identifying step S730.

If the virtual message allocation state for each message object exceeds the preset allowable quota, returning to the message allocation criterion setting step S710, the message allocation criterion may be reset in consideration of the excess of the allowable quota.

If the virtual message allocation state for each message object does not exceed a preset allowable quota, there may be terminated the message allocation simulation process in the vehicle communication control method according to an embodiment.

Figure 8:
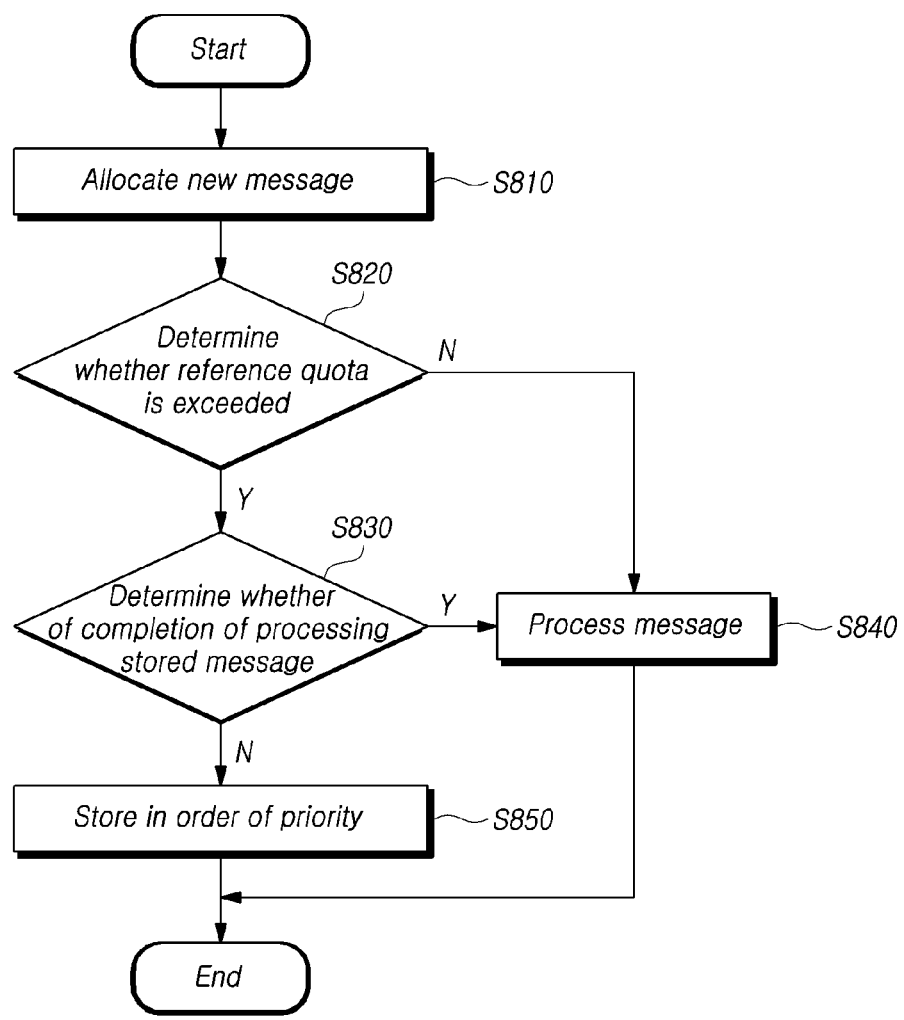
FIG. 8 is a flowchart for exemplarily explaining a message processing process in consideration of priority in a vehicle communication control method according to an embodiment.

FIG. 8 is a flowchart for exemplarily explaining a message processing process in consideration of priority in a vehicle communication control method according to an embodiment.

Referring to FIG. 8, the message processing process in a vehicle communication control method according to an embodiment may include allocating a new message S810, determining whether the reference quota is exceeded S820, determining whether processing of the stored message is complete S830, processing the message S840, and storing in the order of priority S850.

The allocating a new message S810 may include, if a transmission/reception request for a new message occurs, allocating the new message to a hardware resource of the vehicle communication control device. The hardware resources may include message objects. In addition, the message object may include a message object register that the message can access.

In this case, the message allocation criterion may be set based on the communication period information of the message, so that messages having the same communication period information are allocated to the same message object.

If the message allocation criterion is set in this way, each message may be grouped according to the period, and the influence of a time difference may be minimized when multiple messages access one message register at the same time.

In addition, the message allocation criterion may be set such that a message having a higher priority is allocated first for messages having the same communication period information.

In determining whether the reference quota is exceeded S820 may include determining whether there is a stored message previously allocated and stored in a message object to which a new message is allocated.

For example, if a message quota of a corresponding message object is two or more based on a time point at which a new message is allocated, there may be determined that there is a stored message previously allocated and stored.

If it is determined that the stored message previously allocated and stored in the message object does not exist, the message processing step S840 may be performed.

If it is determined that there is a stored message previously allocated and stored in a message object, there may be performed a step S830 of determining whether processing of the stored message is complete.

The determining whether processing of the stored message is complete may include determining whether the message object has completed processing of a stored message previously allocated and stored.

If it is determined that the processing of the stored message previously allocated and stored is completed, the new message may be stored in the allocated object, and a message processing step S840 for the new message may be performed.

If it is determined that the processing of the stored message previously allocated and stored is not completed, there may be performed a step S850 of storing in the order of priority.

The message processing step S840 may including the message object accepting a transmission/reception request for a new message. Accordingly, a new message can be stored and processed in the corresponding message object.

The step S850 of storing in the order of priority may include storing a new message and the stored message stored in the message object in a buffer. In this case, the priorities may be compared based on the priority information of the new message and the stored message, and the new message and the stored message may be stored in the buffer in the order of priority. Thereafter, if the message quota of the allocated message object is changed to be less than or equal to the reference quota, there may be controlled the messages stored in the buffer to be stored in a corresponding message object in order of priority, and a message having a higher priority to be processed first. Here, the priority information may be set based on a preset priority assignment criterion. Alternatively, based on the transmission/reception request time of the message, the first requested message may be set to have a higher priority.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A vehicle communication device comprising:
a storage device including at least one message object in which a message is stored; and
a controller configured to allocate the message to a controller area network (CAN) message object determined based on a preset message allocation criterion, to determine whether the message can be stored based on a state of the allocated message object, and to control the message to be processed if the message is stored in the allocated message object,
wherein the message comprises communication period information on a communication period of the message and identification number information on an identification number of the message,
wherein the message allocation criterion is set based on at least one of the communication period information and the identification number information,
wherein, if there are at least two messages having different communication period information, the controller creates a message group by grouping the messages according to a preset communication period range based on the communication period information, and sets the message allocation criterion so that each message group is allocated to the different message objects.

2. The vehicle communication device of claim 1, wherein the message allocation criterion is set so that messages having the same communication period information are allocated to the same message object.

3. The vehicle communication device of claim 1, wherein the message comprises priority information about a priority of the message,
wherein, if a new message is allocated to the message object, the controller controls to store the new message in the message object, and, if there are at least two messages stored in the message object, the controller controls such that a message having a higher priority information is processed first.

4. The vehicle communication device of claim 1,
wherein the controller is further configured to:
generate at least two or more test messages, and perform a test message allocation simulation of allocating each test message to the message object based on the message allocation criterion,
determine a test message quota for the number of test messages allocated to each of the message objects based on a result of the test message allocation simulation, and
change the message allocation criterion, if at least one of the test message quota for each message object exceeds a preset allowable quota, so that the test message quota does not exceed the allowable quota.

5. A vehicle communication device comprising:
a storage device including at least one message object in which a message is stored; and
a controller configured to alocate the message to a controller area network (CAN) message object determined based on a preset message allocation criterion to determine whether the message can be stored based on a state of the allocated message object, and to control the messaoe to be processed if the message is stored in the allocated message object,
wherein the message comprises communication period information on a communication period of the message and identification number information on an identification number of the message,
wherein the message allocation criterion is set based on at least one of the communication period information and the identification number information,
wherein the controller allocates the message according to the the message allocation criterion determined based on the identification number information of the message, and, if a preset criterion change condition is satisfied, allocates the message based on the communication period information.

6. The vehicle communication device of claim 5, wherein the criterion change condition is set based on whether of an arrival of a time point which is set based on a least common multiple period determined by the communication period information,
wherein, if the criterion change condition is satisfied, the controller controls messages having the same communication period information to be allocated to the same message object.

7. The vehicle communication device of claim 6, wherein the least common multiple period is determined based on a test message allocation simulation.

8. The vehicle communication device of claim 6, wherein the least common multiple period is determined based on the communication period information of a selection message selected by a preset selection number from among the messages.

9. The vehicle communication device of claim 8, wherein the selection number is selected so as not to exceed the number of message objects, and so that the communication period information of each selection message is different from each other.

10. A vehicle communication method comprising:
setting a message allocation criterion for allocating a message to one of at least one message object based on at least one of communication period information on a communication period of the message and identification number information on an identification number of the message;
allocating the message to a controller area network (CAN) message object determined based on the message allocation criterion; and
determining whether the message can be stored based on a state of the allocated message object, and controlling, if the message is stored in the allocated message object, the message to be processed,
wherein the message comprises priority information about a priority of the message,
wherein, determining whether the message can be stored comprises, if a new message is allocated to the message object, controlling to store the new message in the message object, and, if there are at least two messages stored in the message object, controlling such that a message having a higher priority information is processed first.

11. The vehicle communication method of claim 10, wherein the setting of the message allocation criterion comprises setting the message allocation criterion so that messages having the same communication period information are allocated to the same message object.

12. The vehicle communication method of claim 10, wherein the allocating of the message comprises allocating the message according to the message allocation criterion determined based on the identification number information of the message, and, if a preset criterion change condition is satisfied, allocating the message based on the communication period information.

13. The vehicle communication method of claim 12, wherein the criterion change condition is set based on whether of an arrival of a time point which is set based on a least common multiple period determined by the communication period information.

14. A vehicle communication method comprising:
setting a message allocation criterion for allocating a message to one of at least one message obiect based on at least one of communication period information on a communication period of the message and identification number information on an identification number of the message;
allocating the message to a controller area network (CAN) message object determined based on the message allocation criterion;
determining whether the message can be stored based on a state of the allocated message object and controlling, if the message is stored in the allocated message object, the message to be processed; and
resetting the message allocation criterion performed after setting the message allocation criterion,
wherein the resetting of the message allocation criterion comprises:
generating at least two or more test messages, and performing a test message allocation simulation of allocating each test message to the message object based on the message allocation criterion,
determining a test message quota for the number of test messages allocated to each of the message objects based on a result of the test message allocation simulation, and
changing the message allocation criterion, if at least one of the test message quota for each message object exceeds a preset allowable quota, so that the test message quota does not exceed the allowable quota.

* * * * *